(12) United States Patent
Olsen et al.

(10) Patent No.: US 6,871,518 B2
(45) Date of Patent: Mar. 29, 2005

(54) GAS SYSTEM COMPONENT INLET OR OUTLET CONNECTION RETAINING BRACKET

(75) Inventors: Jason L. Olsen, Graham, NC (US); Vincent J. Avillion, Gibsonville, NC (US)

(73) Assignee: Engineered Controls International Inc., Elon College, NC (US)

( * ) Notice: Subject to any disclaimer, the term of this patent is extended or adjusted under 35 U.S.C. 154(b) by 42 days.

(21) Appl. No.: 10/106,694

(22) Filed: Mar. 26, 2002

(65) Prior Publication Data

US 2002/0100520 A1 Aug. 1, 2002

Related U.S. Application Data

(60) Provisional application No. 60/347,687, filed on Oct. 23, 2001.

(51) Int. Cl.[7] .............................................. F16K 35/00
(52) U.S. Cl. .............................. 70/176; 70/177; 285/80; 137/382; 220/724
(58) Field of Search ................................ 285/80, 8, 45, 285/81; 137/382, 382.5, 383; 70/176, 177, 178, 232; 220/724, 725, 726

(56) References Cited

U.S. PATENT DOCUMENTS

| | | | | |
|---|---|---|---|---|
| 619,795 | A | * | 2/1899 | Schreiner .................... 70/232 |
| 918,784 | A | * | 4/1909 | Snow ............................. 42/79 |
| 994,409 | A | * | 6/1911 | Kelly ........................... 70/178 |
| 1,084,850 | A | * | 1/1914 | Ford .......................... 411/338 |
| 3,678,717 | A | * | 7/1972 | Eaton .......................... 70/232 |
| 4,352,370 | A | * | 10/1982 | Childress ................... 137/382 |
| 4,380,247 | A | * | 4/1983 | Douglas ..................... 137/382 |
| 4,458,923 | A | * | 7/1984 | Burroughs ..................... 285/8 |
| 4,534,379 | A | * | 8/1985 | Burge ......................... 137/385 |
| 4,587,814 | A | * | 5/1986 | Wilson ........................ 70/232 |
| 4,600,033 | A | * | 7/1986 | Baron ......................... 137/382 |
| 5,092,359 | A | * | 3/1992 | Wirth et al. ................ 137/382 |
| 5,182,928 | A | * | 2/1993 | O'Fearna ..................... 70/232 |
| 5,305,622 | A | * | 4/1994 | Flores ......................... 70/177 |
| 5,353,833 | A | * | 10/1994 | Martinez .................... 137/385 |
| 5,806,555 | A | * | 9/1998 | Magno, Jr. .................. 137/385 |
| 6,244,290 | B1 | * | 6/2001 | Reicin et al. ............... 137/312 |

* cited by examiner

Primary Examiner—James M. Hewitt
(74) Attorney, Agent, or Firm—Neal, Gerber & Eisenberg LLP

(57) ABSTRACT

A removable retaining bracket that prevents removal of a connection fitting from a gas distribution system component is described. The retaining bracket has a base that defines an opening that accepts the connection fitting and prevents removal of the fitting from the gas distribution component. The retaining bracket extends along the gas distribution system component and defines openings in which a securing component is positioned. The openings are positioned to locate the securing component to prevent removal of the retaining bracket.

6 Claims, 2 Drawing Sheets

GAS SYSTEM COMPONENT INLET OR OUTLET CONNECTION RETAINING BRACKET

CROSS-REFERENCE TO RELATED APPLICATIONS

Priority is claimed from provisional application U.S. Ser. No. 60/347,687, filed Oct. 23, 2001. The entire specification and all the claims of the provisional application referred to above are hereby incorporated by reference to provide continuity of the disclosure.

STATEMENT REGARDING FEDERALLY SPONSORED RESEARCH OR DEVELOPMENT

Not applicable.

BACKGROUND OF THE INVENTION

Gases are used for various purposes in industrial, medical, and food and beverage applications. Such uses include medical oxygen for life support, medical nitrous oxide for anesthesia, medical helium for Magnetic Resonance Imaging equipment, medical nitrogen for cryosurgery, nitrogen for food packaging, carbon dioxide for beverage carbonation, industrial nitrogen for purging welding oxygen, welding argon, carbon dioxide for laser cutting and nitrogen use by the silicon chip industry. Many of these applications, including medical and food and beverage uses, directly implicate health and safety.

Gas is delivered to a location at which it is needed by a distribution system that includes devices to regulate or distribute gas and pipe or tubing connecting the devices in the distribution system. Commonly, gas is supplied to a distribution system from tanks or cylinders that have fittings that are connected to the distribution system. Gas cylinders, pipes, valves, and other components of a gas distribution system are connected to each other by connection fittings. Because of safety considerations, the United States Food and Drug Administration and Compressed Gas Association have recommended that all medical and industrial gas cylinders have the valve connection fittings that are retained such that only authorized persons can remove and reinstall them.

Currently, connection fittings used to connect distribution systems to gas cylinders can be removed and replaced with a wrench while the cylinder is full. Because a fitting can be removed before a scheduled replacement of an empty cylinder by appropriately trained and knowledgeable persons, it is possible that a fitting may be removed and an incorrect connection made. For example, there have been some cases of Nitrogen tanks being delivered to medical applications where Oxygen cylinders should have been delivered. Unauthorized persons removed a Nitrogen connection fitting from a Nitrogen cylinder and replaced it with an Oxygen connection fitting. This allowed Nitrogen to flow into an Oxygen system used to ventilate patients. Breathing the Nitrogen gas asphyxiated several people. There is now a requirement that medical gas cylinders have the fittings attached such that they cannot easily be removed.

Known methods for preventing removal of fittings from gas cylinders include brazing a fitting to a valve, drilling and pinning a fitting to a valve, and use of a lock wire. The various methods of retaining a fitting to a valve or other component have disadvantages.

A lock wire will not prevent removal of a connection fitting. Removal of a lock wire and the connection to which it was attached will not damage the fitting or connected device and therefore allows installation of a wrong fitting. Removal of a lock wire will leave evidence of the removal. However, a lock wire does not prevent harm caused by incorrect connections in a gas distribution system.

Brazing a fitting onto the a valve will prevent the fitting from being removed by unauthorized persons. However, if the fitting is damaged (a common event), the cylinder must be sent to a special facility for the valve to be replaced. This is expensive for three reasons. First the cylinder is out of service and cannot be rented or sold. Second, removal of the valve and fitting are expensive operations requiring highly skilled labor to weld and braze the fitting. Third, a replacement valve and fitting must be installed.

Drilling and pinning a connection fitting into a valve will also prevent the fitting from being removed by unauthorized persons. However, as with brazing a fitting, the cost to replace a damaged fitting is very high. Further, the integrity of the valve is jeopardized by the hole that is drilled to accept the pin.

The brazing and pinning methods retain a connection fitting such that the fitting is not easily removed and if removal is accomplished, the connection no longer is usable. Installation of brazed or pinned fittings is labor intensive and requires special tooling, removal of the cylinder from service, disassembly of the valve and purchase of a repair kit to replace non-reusable valve components.

Accordingly, a need remains for a method of preventing unauthorized removal of connection fittings from valves and other components of gas distribution systems that does not damage the fitting or component. A need also exists for a method of preventing unauthorized removal of connection fittings from components of gas distribution systems that allows quick installation and removal of the fitting for authorized service of the gas distribution system.

BRIEF SUMMARY OF THE INVENTION

The present invention is a retaining bracket that will be used for gas distribution systems, including industrial and medical applications for cryogenic and compressed gas. A retaining bracket according to the present invention mechanically retains a connection fitting by non-permanent methods. A retaining bracket according to the present invention is secured by a means that are either easily removable or not easily removable. When secured by means that are not easily removable, the connection fitting can be removed only by authorized persons.

The bracket is formed to engage a connection fitting and a valve or other component to which the fitting has been connected. The bracket is configured to be positioned on the connection fitting and the connected gas system component after the fitting has been secured to the component. The bracket is formed to engage a securing component that engages the bracket when the bracket is positioned on a fitting and connected gas system component. The securing component prevents removal of the bracket from the fitting and connected component. The securing component can be a one-way bolt, padlock or by other tamper resistant devices. The securing component can also be a lock wire or other removable device that does not prevent removal but that leaves evidence of removal.

Fitting removal and replacement can only be done by first removing the securing component from the retaining bracket and subsequently removing the bracket from the connection fitting and connected component. Thus only authorized persons can perform service that requires removal of the fitting from the connected component.

Accordingly, it is an object of the present invention to provide a retaining bracket for a connection fitting that is connected to a gas distribution system component that prevents removal of the fitting from the component.

Another object of the present invention is to provide a retaining bracket for a connection fitting connected to a gas distribution system component that is quickly installed on and removed from the fitting and connected component.

Still another object of the present invention is to provide a retaining bracket for a fitting connected to a gas distribution system component that can be secured against removal from the fitting and connected component by a securing component that permits the retaining bracket to be quickly secured to and released from the fitting and component without damaging either the fitting or component.

Yet another object of the present invention is to provide a retaining bracket that meets the new industry requirement per CGA Safety Bulletin SB-26 proposed revision 1 for valve connection fittings used on DOT 4L/TC-4LM series cylinders to have valve connections secured "in a manner that prevents removal or would render the connection or valve body outlet unusable if removal was attempted".

Embodiments of the present invention meet one or more of the preceding objects, in whole or in part.

DETAILED DESCRIPTION OF THE PREFERRED EMBODIMENT

Figure 6:
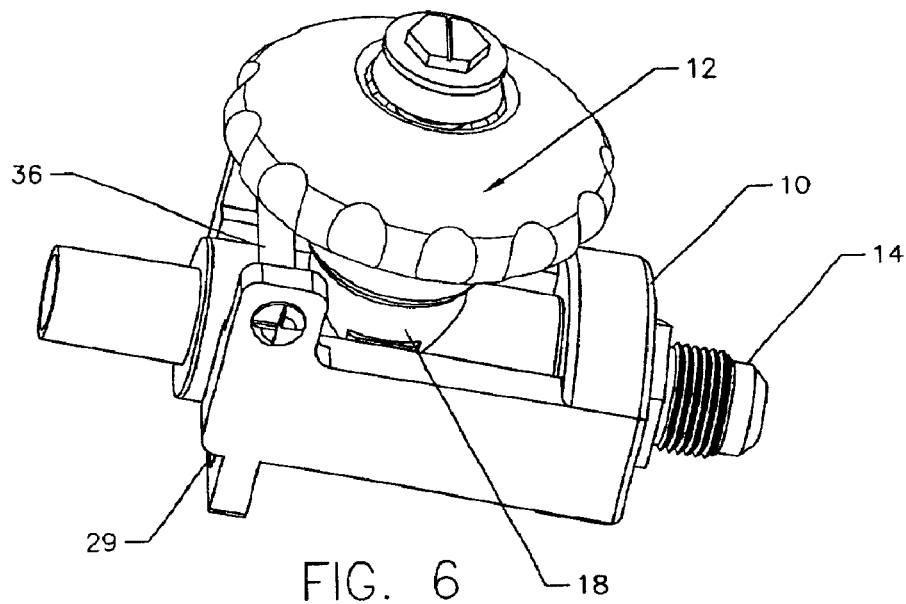
FIG. 6 is an isometric view of the retaining bracket shown by FIG. 1 mounted to a connection fitting and a valve.
Figure 1:
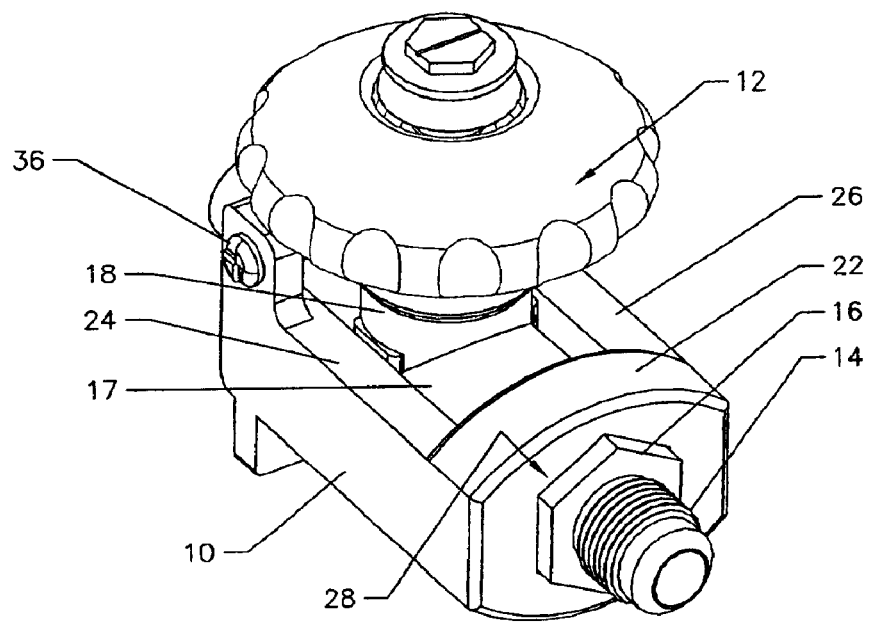
FIG. 1 is an isometric view of a retaining bracket according to the present invention mounted to a valve and connection fitting.

FIG. 1 shows a retaining bracket 10 according to the present invention mounted to a valve 12 and to a connection fitting 14 that is mounted to the valve 12. The valve 12 has a valve body 17 and a bonnet 18 that extends from the body 17. The connection fitting 14 is mounted to the valve 12 at an end of the valve body 17 by a threaded connection. The connection fitting 14 has a hexagonal section 16 that is conventionally formed to be engaged by a wrench to rotate the fitting 14 for mounting to and removal from the valve 12. The hexagonal section 16 is positioned at a location near the valve body 17 by the threaded connection between the valve body 17 and the fitting 14.

The retaining bracket 10 includes a base 22 that defines an opening 28 that is formed to closely surround the hexagonal section 16 of the fitting 14. The bracket 10 has arms 24 and 26 that extend from the base 22 along opposed sides of the valve body 17 to locations separated from the base 22 that are beyond the bonnet 18 from the fitting 14. The arms 24 and 26 define aligned holes 21 and 23, respectively, at a location adjacent to the bonnet 18 and opposite connection fitting 14. A securing pin 36 extends through the openings 21 and 23. The openings 21 and 23 are located so that the securing pin 36 will abut the valve bonnet 18 preventing the bracket 10 from moving along the valve 12 toward the connection fitting 14.

Figure 2:
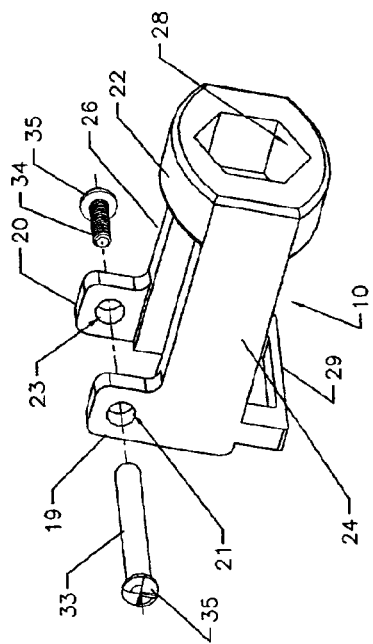
FIG. 2 is an isometric view of the retaining bracket and securing pin shown by FIG. 1.
Figure 5:
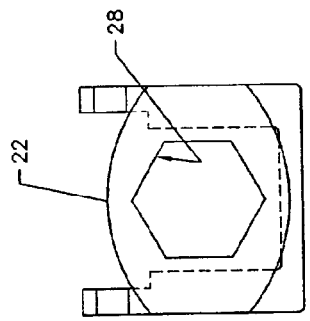
FIG. 5 is an end view of the bracket shown by FIG. 1.
Figure 4:
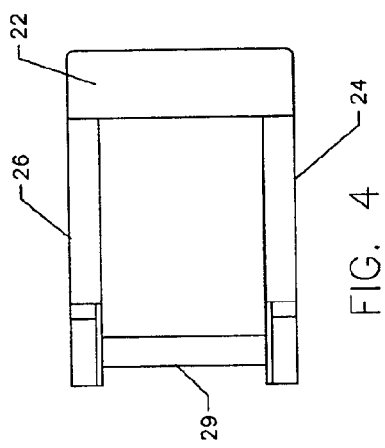
FIG. 4 is a top view of the bracket shown by FIG. 1.
Figure 3:
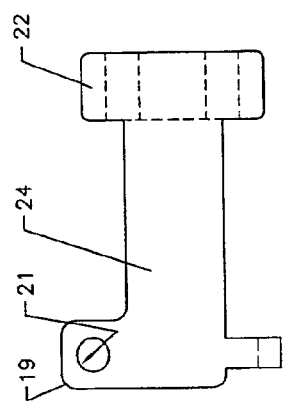
FIG. 3 is a side view of the bracket shown by FIG. 1.

FIG. 2 shows the arms 24 and 26 of the retaining bracket 10 extending from the base 22 parallel to each other. The arms 24 and 26 each define a tab, 19 and 20 respectively, located near an end of the arms 24 and 26 opposite the base 22. The tabs 19 and 20 extend from the arms 24 and 26 respectively a direction that is generally perpendicular to the arms 24 and 26. The tabs 19 and 20 define the aligned holes 21 and 23, respectively, through which the securing pin 36 extends to be positioned adjacent to the valve bonnet 18.

As shown by FIG. 2, the securing pin 36 includes a screw 34 and a rod 33. The rod 33 and the screw 34 each extend from a head 35 that is sized to abut a tab, 19 and 20 respectively, when the rod 33 and the screw 34 extend through the openings 21 and 23 respectively. The rod 33 extends through the opening 21 toward the tab 20. The head 35 of the rod 33 is positioned adjacent to a surface of the tab 19 facing away from the tab 20. The rod 33 forms a threaded opening at an end opposite the head 35. The screw 34 extends through the opening 23 in the tab 20 to meet and engage the threaded opening of the rod 33. The head 35 of the screw 33 is positioned against a surface of the tab 20 facing away from the tab 19. The heads 35 are one way heads that are formed to be engaged by a conventional flat blade screwdriver for installation, but do not permit removal.

The bracket 10 includes a bridging arm 29 that extends from the arm 24 to the arm 26. The bridging arm 29 joins the arms 24 and 26 from locations that are opposite the tabs 19 and 20, respectively. The bridging arm 29 is positioned and configured to extend adjacent to the valve body 17 opposite the securing pin 36 thereby capturing the valve body 17 between the securing pin 36 and the bridging arm 29.

As an alternative to the securing pin 36, the shaft of a lock could be positioned to extend through the holes 21 and 23 to retain the bracket 10 on the valve 12. Other conventional devices that could be used to retain the bracket 10 on the valve 12 include a metal pin and lock wire or tamper-evident tag, and a rivet locking pin.

When positioned on the valve 12 and the connection fitting 14, the retaining bracket 10 prevents removal of the connection fitting 14 from the valve 12. The base 22 prevents removal of the fitting 14 from the valve 12 by preventing a wrench from engaging the hexagonal section 16 of the connection fitting 14. The base 22 also prevents removal of the fitting 14 from the valve 12 by preventing the fitting 14 from rotating. The opening 28 in the base 22 prevents the fitting 14 from rotating within the base 22 by engaging the hexagonal section 16 of the fitting 14. The arms 24 and 26 of the retaining bracket 10 will abut the valve 12 preventing rotation of the bracket 10 and the fitting 14 with respect to the valve 12. The bracket prevents removal of the fitting 14 from the valve 12 when the bracket 10 is positioned surround the hexagonal section 16 of the fitting 14 by opening 28 and the arms 24 and 26 extend adjacent to the valve 12.

The retaining bracket of the present invention has been described with respect to a particular configuration and for use on a specific gas distribution system component. It will be appreciated by those skilled in the art that the invention may be practiced other than as described. For example, and without limitation, different base configurations may be used to prevent removal of a fitting from a connected component, the number and configuration of the retaining arms may be other than as described, and the structure and devices for securing the bracket to a gas distribution system component may be other than as described. Therefore, the invention not be limited to the particular embodiment disclosed and what is sought to be protected is all embodiments falling within the scope of the appended claims.

We claim:

1. A removable retaining bracket for preventing removal of a connection fitting from a distribution system component to which the connection fitting is mounted, comprising:
   a base having an opening sized and configured to substantially conform to at least a portion of the connection fitting to prevent rotation of the fitting within the opening;
   a first arm integral with and extending from the base along the distribution system component and to abut the distribution system component to prevent rotation of the base; and
   a second arm extending from the base along the distribution system component and to abut the distribution system component to prevent rotation of the base;
   wherein the first arm and the second arm are configured to accept a removable member positioned to abut the distribution system component preventing movement of the base away from the distribution system components;
   wherein the distribution system component is a valve and wherein the first arm and the second arm extend from the base along opposed sides of the valve.

2. The removable retaining bracket of claim 1 wherein the base is configured to prevent access to the connection fitting by tools required to remove the fitting from the distribution system component.

3. The removable retaining bracket of claim 1 wherein the opening surrounds a portion of the connection fitting.

4. The removable retaining bracket of claim 1 wherein the first arm and the second arm each define an opening, the openings being located on opposed sides of the valve and aligned to accept a member extending through the openings.

5. The removable retaining bracket of claim 4 wherein a removable securing component extends through the aligned openings.

6. The removable retaining bracket of claim 5 wherein the securing component is a pin comprising:
   a rod having a head at one end sized to abut the first arm adjacent to the opening and a threaded opening at an end of the rod opposite the head, the rod sized to extend through the opening, and
   a screw having a head at one end sized to abut the second arm adjacent to the opening and a threaded portion extending from the head configured to engage the threaded opening in the rod,
   the rod and the screw sized to be positioned in the openings in the first arm and the second arm, to position the head of the rod abutting a surface of the first arm facing away from the second arm and to position the head of the screw abutting a surface of the second arm facing away from the first arm and to extend to each other, the threaded section of the screw engaging the threaded opening of the rod.

* * * * *

UNITED STATES PATENT AND TRADEMARK OFFICE
CERTIFICATE OF CORRECTION

PATENT NO. : 6,871,518 B2
DATED : March 29, 2005
INVENTOR(S) : Jason L. Olsen and Vincent J. Avillion It is certified that error appears in the above-identified patent and that said Letters Patent is hereby corrected as shown below:

Column 6,
Lines 1 and 3, replace "1" with -- 1, --.
Line 7, replace "4" with -- 1, --.
Line 10, replace "5" with -- 5, --.

Signed and Sealed this

Twenty-eighth Day of June, 2005

JON W. DUDAS
*Director of the United States Patent and Trademark Office*